United States Patent
Thomas (10) Patent No.: US 9,646,280 B2
(45) Date of Patent: May 9, 2017

(54) SYSTEM AND METHOD FOR MANAGING THE DELIVERY OF ORDERS FOR GOODS

(75) Inventor: Andrew Thomas, Evanston, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 1536 days.

(21) Appl. No.: 10/584,417

(22) PCT Filed: Jan. 25, 2005

(86) PCT No.: PCT/US2005/002299
§ 371 (c)(1),
(2), (4) Date: Jun. 23, 2006

(87) PCT Pub. No.: WO2005/072328
PCT Pub. Date: Aug. 11, 2005

(65) Prior Publication Data
US 2009/0043617 A1    Feb. 12, 2009

Related U.S. Application Data

(60) Provisional application No. 60/539,921, filed on Jan. 28, 2004.

(51) Int. Cl.
*G06Q 10/08* (2012.01)
*G06Q 10/00* (2012.01)

(52) U.S. Cl.
CPC ............ *G06Q 10/08* (2013.01); *G06Q 10/00* (2013.01); *G06Q 10/083* (2013.01); *G06Q 10/087* (2013.01); *G06Q 10/0833* (2013.01)

(58) Field of Classification Search
CPC ...... G06Q 10/00; G06Q 10/08; G06Q 10/083; G06Q 10/0833; G06Q 10/087
See application file for complete search history.

(56) References Cited

U.S. PATENT DOCUMENTS

| | | | |
|---|---|---|---|
| 5,386,462 A | 1/1995 | Schlamp | |
| 5,774,053 A * | 6/1998 | Porter | A47G 29/141 232/19 |
| 5,971,273 A | 10/1999 | Vallaire | |
| 6,026,378 A | 2/2000 | Onozaki | |
| 6,085,170 A | 7/2000 | Tsukuda | |
| 6,456,900 B1 | 9/2002 | Kabuta | |
| 6,539,360 B1 | 3/2003 | Kadaba | |
| 6,879,962 B1 * | 4/2005 | Smith et al. | 705/22 |
| 7,129,837 B2 * | 10/2006 | Shannon et al. | 340/539.13 |
| 7,292,989 B2 * | 11/2007 | DeMaggio | 705/8 |
| 7,395,273 B2 * | 7/2008 | Khan et al. | |
| 7,739,202 B2 * | 6/2010 | Kadaba | 705/338 |
| 2001/0013007 A1 | 8/2001 | Tsukuda | |

(Continued)

OTHER PUBLICATIONS

Thomas, Andrew, "System and Method for Managing the Delivery of Orders for Goods," Jun. 23, 2006, pp. 1-2.*

*Primary Examiner* — Asfand Sheikh
(74) *Attorney, Agent, or Firm* — Greenberg Traurig, LLP (57) ABSTRACT

A system and method for managing the delivery of goods. The system and method particularly provides for manifesting and controlling route-based delivery of orders or packages from a vendor to one or more locations accessible by customers. The locations may include automated, self-service vending machines and/or will-call lockers, under the control of a system (ideally centralized and automated) that can receive and actively manage manifest information.

10 Claims, 8 Drawing Sheets

(56) References Cited

U.S. PATENT DOCUMENTS

| | | | |
|---|---|---|---|
| 2002/0010661 A1* | 1/2002 | Waddington | G06Q 10/08 705/28 |
| 2002/0035515 A1 | 3/2002 | Moreno | |
| 2002/0161475 A1 | 10/2002 | Varga | |
| 2003/0052778 A1 | 3/2003 | Wong | |
| 2004/0133438 A1* | 7/2004 | Zeisset et al. | 705/1 |
| 2004/0133528 A1* | 7/2004 | Furka | 705/401 |
| 2004/0215588 A1* | 10/2004 | Cornelius | 707/1 |
| 2004/0243452 A1* | 12/2004 | Barton | G06Q 10/08 705/337 |
| 2005/0137933 A1* | 6/2005 | Holsen et al. | 705/10 |

* cited by examiner

SYSTEM AND METHOD FOR MANAGING THE DELIVERY OF ORDERS FOR GOODS

FIELD OF INVENTION

This invention generally relates to a system and method for managing the delivery of goods and, more particularly, to a system and method which functions to manifest and control route-based delivery of orders for goods (e.g., packages) from a central servicing warehouse of a vendor to one or more locations easily accessible by customers.

BACKGROUND

In the art, various systems and methods for delivering goods to customers at remote locations are known. By way of example, published U.S. Patent Application No. 2002/0035515, entitled "System And Method For Remotely Coordinating The Secure Delivery Of Goods," describes a system that enables a customer to specify a delivery of goods while allowing a vendor
to schedule the delivery of the goods without requiring the availability of the customer. To this end, the described system and method utilizes a secure storage unit which contains a plurality of individual lockers to which goods may be delivered at the convenience of the vendor and retrieved at the convenience of the customer. Access to the interior of a locker is controlled by a server which is in communication, via an Internet or other network connection, with a mechanism that controls the opening and closing of the locker. The server controls the accessing and operation of the locker either directly or in combination with a controller associated with a locker. The controller is suitably situated in a kiosk that provides user interfaces by which customers, vendors, and/or common carriers access and utilize the locker. The kiosk may also include other vending machines and dispensing devices which are also preferably under the control of the server. A storage unit having a plurality of lockable lockers, a settling unit for settling charges for the delivery of goods, and a locker door controlling unit for controlling the opening and closing of a door provided to each of the plurality of lockers is also described in U.S. Pat. No. 6,456,900, entitled "Locker Type Merchandise Delivering System."

Still further, published U.S. Patent Application No. 2002/0161475, entitled "Apparatus And Method For Improved Vending Machine Inventory Maintenance," describes providing a vending machine with a unique identifier which is used to provide a central processing center, which is connected to the vending machine via a network, with information concerning goods dispensed from the vending machine. The central processing unit utilizes the information to schedule maintenance visits to the vending machine. In particular, the information is utilized to efficiently schedule the delivery of replacement inventory to a system of vending machines. A further system for monitoring inventory of storage units, such as mailboxes, bins, and shelves, is described in published U.S. Patent Application No. 2003/0052778.

While the systems described in these references generally work for their intended purpose, the described systems fail to address the need for a system and method that facilitates, documents, and controls the delivery of orders for goods from one or more centralized warehouses to a network of remote locations in a quick and reliable manner and which provides current and accurate information about the location and the status of orders and associated inventory.

SUMMARY OF THE INVENTION

To address this and other needs, the following describes a system and method for managing the delivery of orders for goods and, more particularly, for manifesting and controlling route-based delivery of orders for goods from a central servicing warehouse of a vendor to one or more locations easily accessible by customers.

An appreciation of the objects, advantages, features, properties and relationships of the system and method will be obtained from the following detailed description and accompanying drawings which set forth illustrative embodiments that are indicative of the various ways in which the principles thereof may be employed.

BRIEF DESCRIPTION OF THE DRAWINGS

For a better understanding of the disclosed system and method for managing the delivery of orders for goods, reference may be had to preferred embodiments shown in the following drawings in which.

DETAILED DESCRIPTION

With reference to the figures, a system and method for managing the delivery of orders for goods is hereinafter disclosed. As will become apparent, the disclosed system and method provides for manifesting and controlling route-based delivery of orders for goods from a central servicing warehouse of a vendor to one or more locations easily accessible by customers. Generally, the customer accessible locations may be remote sites or facilities that hold and deliver goods to customers, and could include retail stores, sales offices, supply rooms, will-call pick up points, vending machines, self-service lockers, etc. While not required, it is preferred that the customer accessible locations be automated with self-service vending machines and/or will-call lockers under the control of a system (ideally centralized and automated) that can receive and actively manage manifest information. In such an environment, the shipment of orders for goods could be "will-call" orders, previously placed by customers, that are being transported and staged at more convenient facilities on or very near the premises of an ordering customer. Furthermore, the orders could be replenishment orders, to restock inventories at the remote sites that have been drawn down below predetermined reorder points.

To facilitate the delivery of orders for goods, the remote sites may be assigned to a "route" which a delivery truck will follow from a fulfilling location to the one or more of the remote sites assigned to the route. While traveling the route, the delivery truck may pick up goods, such as returns, as well as drop off deliveries of orders for goods. The route assignments and delivery runs could be ad hoc, based on demand, but are preferably somewhat fixed and serviced daily or more frequently according to a regular schedule. Routes and schedules may then be designed for maximum logistical efficiency, to minimize drive time and distance, and to avoid bottlenecks and heavy traffic.

Figure 1:
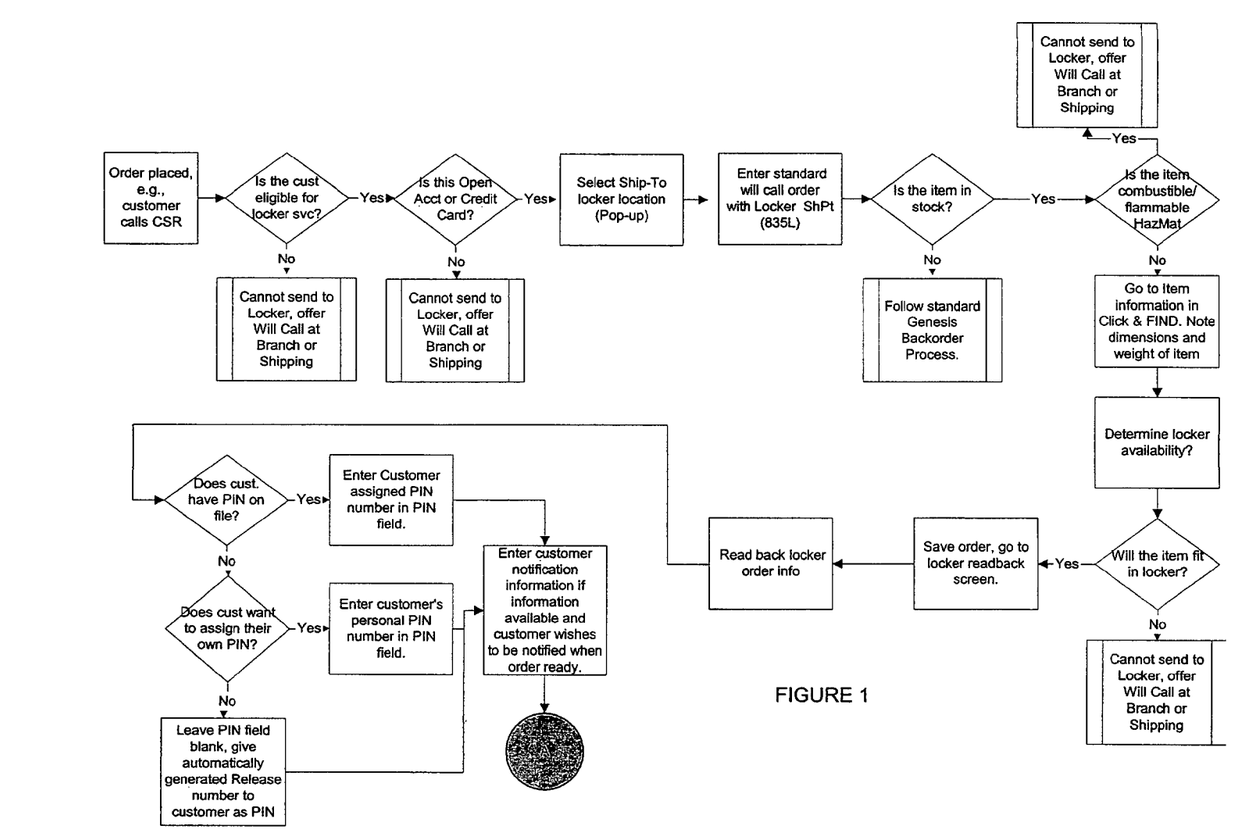
FIG. 1 is a flow chart illustrating exemplary steps in a goods ordering process.

To initiate the delivery, orders for goods are preferably received at a central servicing warehouse for picking, packaging, and staging for delivery via a delivery truck, as is illustrated in FIG. 1. Ordering may be accomplished by a customer calling a customer service representative associated with central servicing warehouse. Orders could also be generated manually or automatically to restock inventories at remote sites that have been drawn down below predetermined reorder points. It will also be appreciated that orders may be directed to the central servicing warehouse by means of an Internet Web site, e-mail, EDI, or the like using conventional e-commerce technology.

Once an order for goods is received, the system may then determine if the customer and/or goods are eligible for delivery according to the processes described hereinafter. In this regard, customer qualification may be determined by simply inquiring if the customer is in a location that has access to a remote site of the system. Additional qualification tests may include an inquiry into the credit worthiness of the customer, i.e., does the customer have an account with the vendor, a determination if the requested goods are currently in stock, a determination if any of the requested goods are of a type ineligible for processing in the manner described hereinafter (e.g., a combustible/flammable or hazmat designated good), etc. If it is determined that either the customer or the requested goods are ineligible for delivery via the processes described hereinafter, the customer will be so notified and, possibly, provided with alternative means for receiving the goods. It is to be appreciated that the eligibility determinations may be fully or partially automated without limitation.

When it is determined that the requested goods may be delivered to the customer via the processes described hereinafter, the system preferably determines an exact ship-to location for the order for goods. By way of example, the ship-to location may be a remote site with a staff and a secure storage area or may include one or more secure lockers and/or vending machines for receiving, holding, and releasing orders to customers. Again, this process may be fully or partially automated (e.g., the system may automatically assign, or display to an operator for selection, lockers based upon locker availability, locker size requirements, etc.). If no ship-to location is found to be available for the requested order for goods, the customer may be so notified and, possibly, provided with an alternative means for receiving the requested goods. If the appropriate ship-to locations are found to be available, a standard order may be placed for the goods which will indicate the corresponding ship-to locations.

To provide access to the order for goods once delivered to a ship-to location, in the case where a ship-to location is an automated, secure locker or the like, the system may additionally determine if the customer has a personal identification number ("PIN") on file. As will be appreciated, a PIN may be used by the customer in a conventional manner to open a securable ship-to location. If the customer does not have a PIN, the customer may provide a PIN to the system or the system may automatically assign a PIN to the customer. An assigned PIN may be limited to a single-use, i.e., be an Order Release Number ("ORN") for that order. In any of these cases, the PIN or ORN for the customer may then be associated with the order for later entry into the system as the code needed to access the ship-to location once the order for goods has been delivered. The customer may also be provided with an opportunity during the ordering stage to provide contact information to the system whereby the system may issue tracking and/or delivery status to the customer related to the order. The contact information may include a phone number, e-mail address, or the like.

Figure 2:
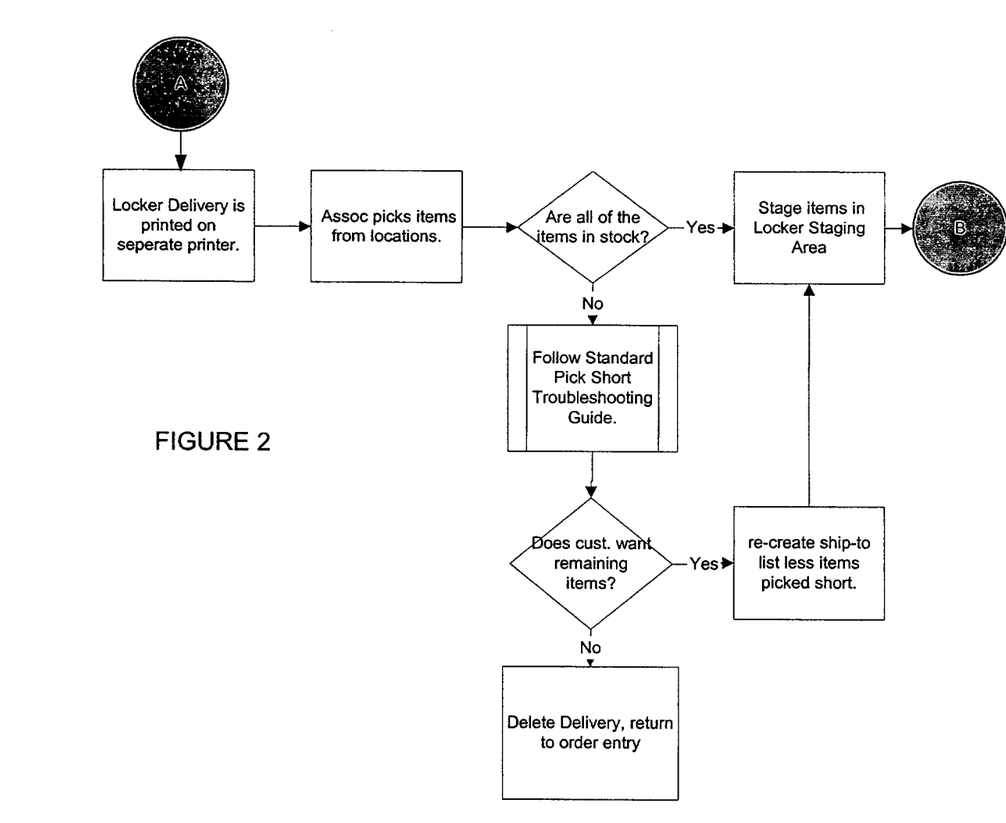
FIG. 2 is a flow chart illustrating exemplary steps in an order delivery preparation process.

To prepare the ordered goods for delivery to one or more ship-to locations, a check is preferably made to determine if, in fact, the requested goods are in stock and available at the central servicing warehouse. It will be appreciated that this availability process may be performed manually and/or be automated. In the event that the process determines that all of the requested goods are not in stock, the customer may be provided with an opportunity to cancel the delivery of all of the requested goods, modify the order for goods, or request the delivery of those goods that are in stock. If the checking process is manual, it usually would occur at the same time as the goods are physically pulled from inventory and committed to filling a specific order. As generally illustrated in FIG. 2, this process would usually also entail the retrieval and staging of the ordered goods, and their designation as packages, or their aggregation and repacking into packages as necessary, in a suitable way, that will make up the constituent parts of the order for physical transportation and delivery to the remote site and eventually to the customer.

Figure 3A:
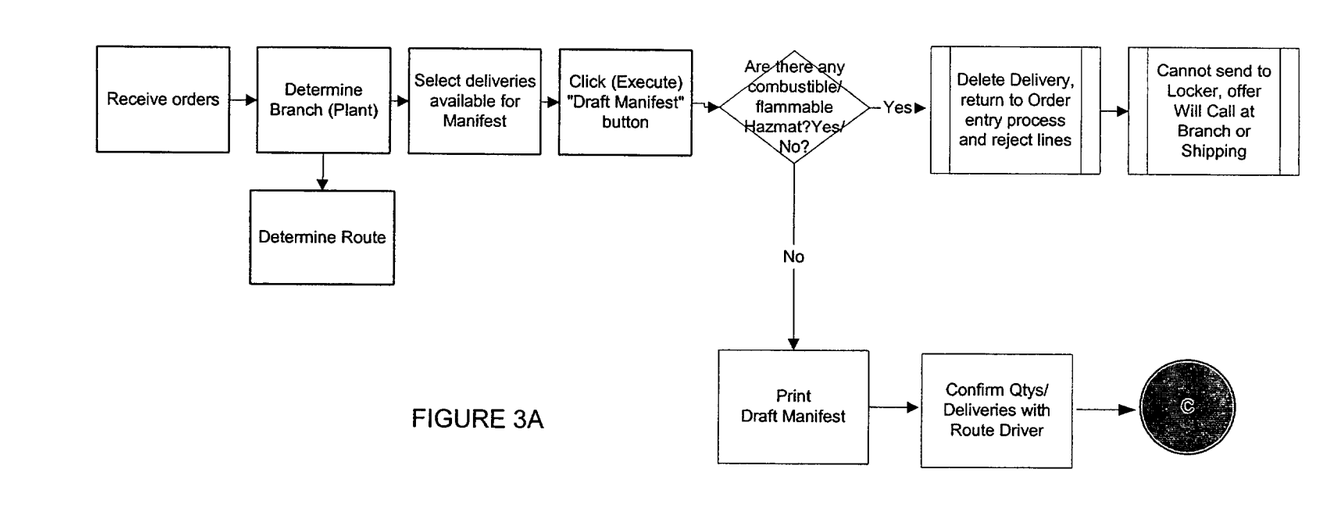
FIGS. 3A, 3B, and 3C illustrate, in flow chart form, exemplary steps in an order delivery process.
Figure 3B:
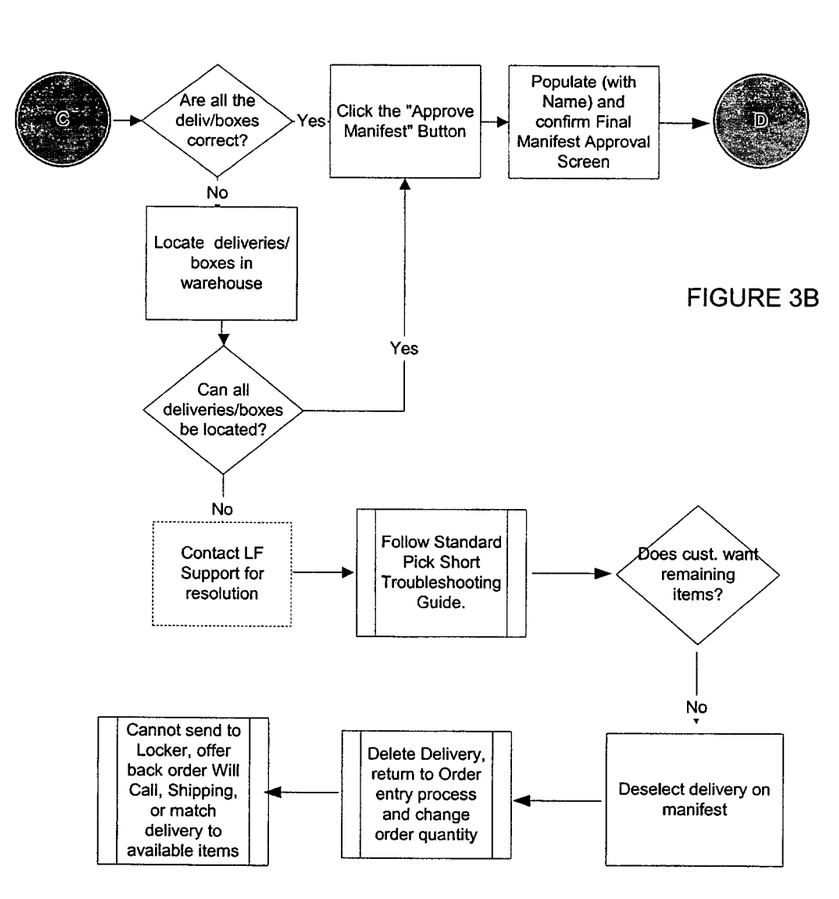
Figure 3C:
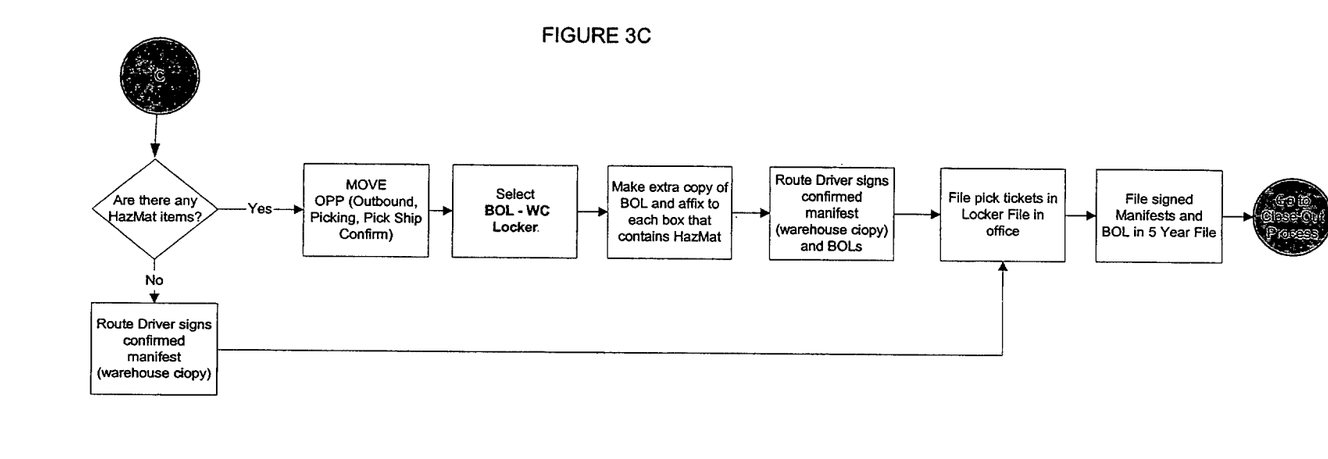

More specifically, the described processing of orders utilizes a manifesting process which functions to provide current, accurate information about the location and status of orders and the associated inventory of goods, and to document and control the hand-off of custody between the parties involved in the process. As illustrated in FIGS. 3A-3C, the manifesting process preferably begins when all outstanding orders to be transported to ship-to sites on a specific route are identified and are compiled into a logical grouping, referred to hereinafter as a "draft manifest." The manifesting process would preferably keep track of the relationship between orders and the packages hat make them up, and may additionally print out totals of both orders and packages to aid in the delivery process. If not already done at the packing state described earlier, the warehouse staff would designate and mark multiple packages associated with an order (e.g., as "1 of 3," "2 of 3," and "3 of 3"). They would then update the "number of packages" field in the manifest system from the default value of 1 (to in the example case "3"). In this manner, warehouse staff (or an automated process) may access the draft manifest to identify orders or packages which may then be physically segregated into a designated staging area near a shipping dock. The aggregated orders or packages may be further reviewed against the draft manifest to confirm that all the orders or packages listed, and no others, are in fact going out on the next delivery truck for that route. In the event that this further check determines that any orders or packages are missing or incomplete, or orders or packages cannot be put on the truck for reason of lack of space, hazardous material restrictions, etc., entries in the draft manifest are preferably deleted, added and/or modified until the draft manifest properly reflects the actual collection of orders or packages that will be loaded on the truck.

When packaged for delivery, each drop off container which contains the orders or packages to be delivered is preferably separately identified with a tracking number, barcode label, RFID tag, or the like. Additional labels may also be supplied to shipping containers having deliverable goods that require special handling instructions, e.g., fragile, HAZMAT or the like, which label would include any required special handling instructions. The identification of such goods may also be automatically printed and attached to the driver's hard copy of the manifest, in case of accident, and as required by law. Labels may also be applied to shipping containers which indicate the put away location of the orders or packages at the ship-to site to simplify and improve the speed of stocking the ship-to site (e.g., the specific locker which may be pre-identified and documented as part of the picking and packing process). Still further, the orders or packages may be organized in route delivery sequence for allowing the driver to follow the most efficient route and to enable a truck to be loaded in last in first out order to thereby simplify and speed up the unloading of the truck at each delivery site.

Once it is determined that the draft manifest record accurately reflects the collection of orders or packages to be loaded, the draft manifest file is "committed," i.e., the "committed manifest" becomes the official, permanent record of the delivery consigned to the truck for that run on that route. Hard copies of the committed manifest may be printed to document and support various physical steps in the process. For example, a hard copy of the committed manifest could be printed for the truck driver to document the sequence of stops at remote sites and the specific orders or packages to be dropped off at each stop. A hard copy of the committed manifest could also be printed for the warehousemen to document the specific orders or packages and associated inventory consigned to the driver. In this regard, the driver could sign the copy of the warehousemen to acknowledge receipt of the orders or packages.

The committed manifest record is further posted into the warehouse inventory management system to update the records to reflect the fact that the inventory has left the building and is now under the control of the truck driver. Furthermore, the information in the committed manifest record may be communicated to the receiving and/or inventory control system at each of the remote sites to advise them of the orders or packages to expect. In this regard, if a PIN or ORN is associated with a manifest delivery record, the inventory control system associated with the ship-to site may also be informed of the PIN or ORN at this time, e.g., in the case where the ship-to site includes a secure locker. It will be further appreciated that electronically transmitting detailed information to the ship-to site concerning the manifested orders or packages will not only speed up driver delivery of the orders or packages to the ship-to site (especially in the case of where machines are to be loaded), but will also improve overall accuracy, as the driver only has to communicate enough information to identify the orders or packages to the ship-to site. In addition, electronically sending sensitive information to the ship-to site, such as the contents of an order, or the automated release code, reduces risk of theft.

Figure 4A:
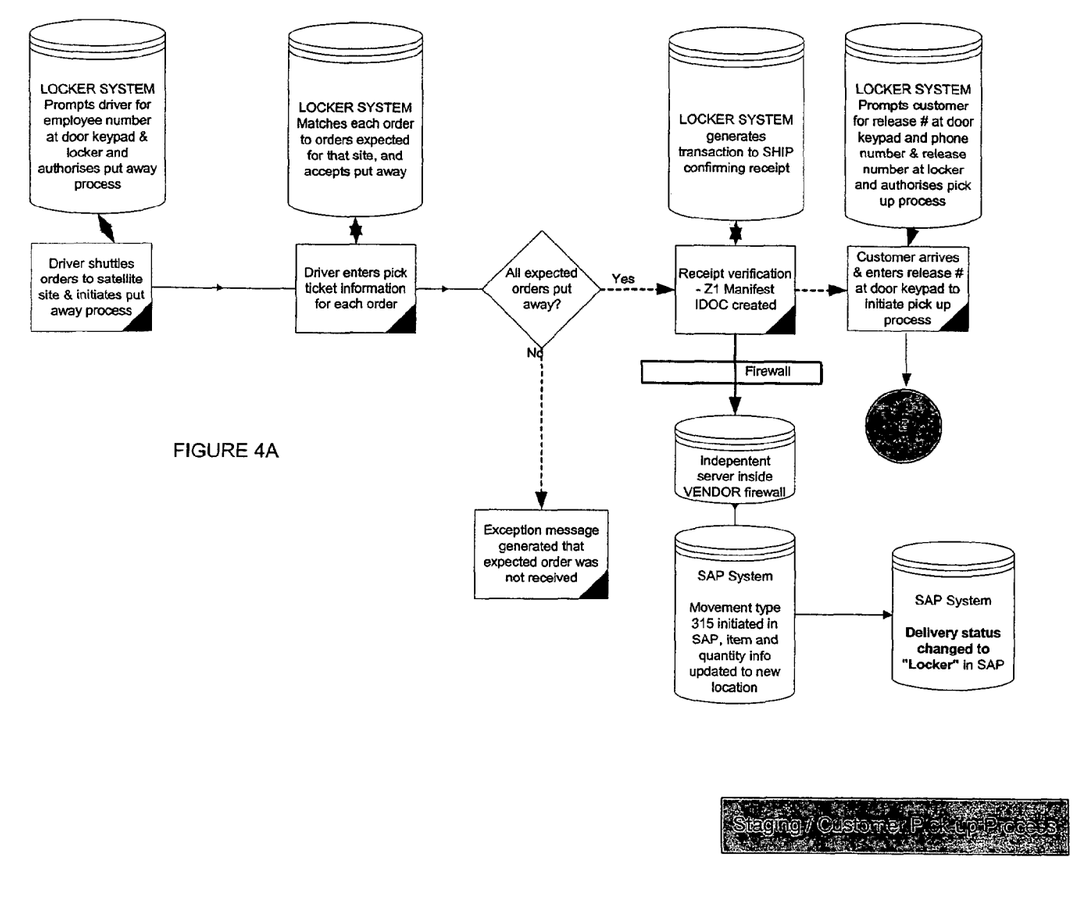
FIGS. 4A and 4B illustrate, in flow chart form, exemplary steps in an order pickup process.
Figure 4B:
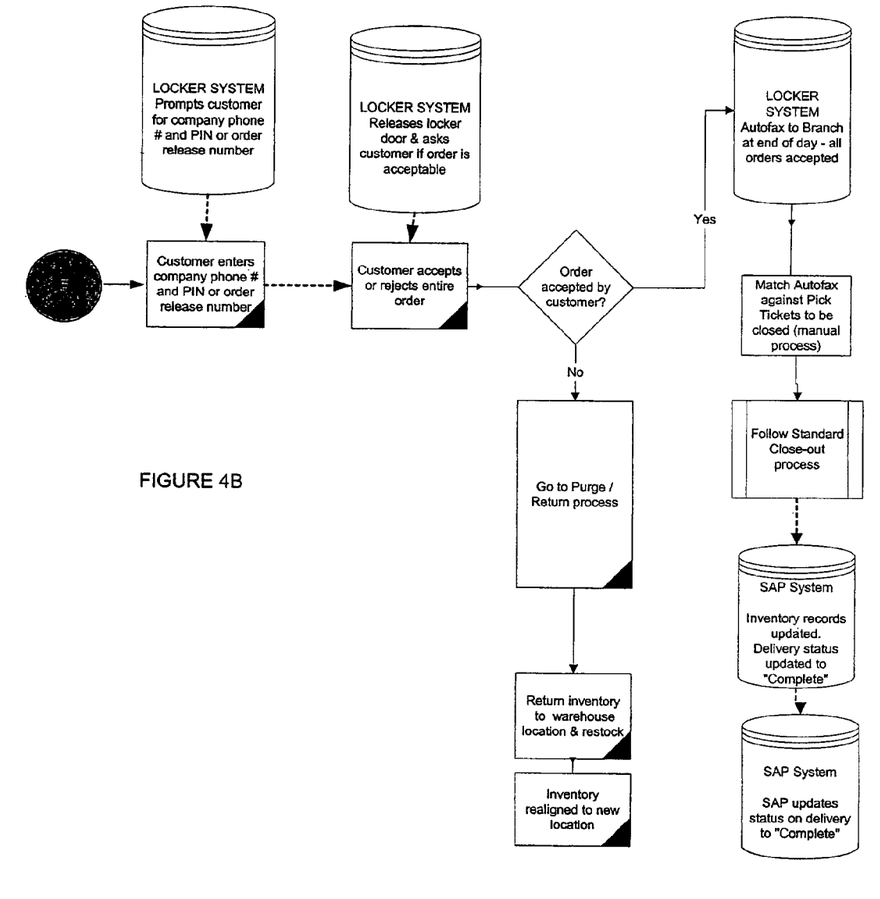

When the delivery driver arrives at the remote site, as illustrated in FIGS. 4A and 4B, the inventory control system of the ship-to site, knowing what orders or packages to expect, logically checks off each order or package as it is tendered. The order or package identification data associated with the check-off procedure may be entered into the inventory control system manually or automatically. For example, the driver may read the order or package barcode(s) into the inventory control system with a scanner or key the number into a keypad associated with the inventory control system. Alternatively, the ship-to site may be equipped with an RFID system that would read RFID tags associated with the order or package for entering data into the inventory control system.

During the delivery process, if the driver tenders an order or package that the staff or inventory control system was not told to expect, the staff or the inventory control system preferably advises the driver that the order or package may be being tendered in error. To this end, the inventory control system may indicate a visual or audible "order or package not recognized" signal which would generally indicate a keying error, an order or package intended for a later site, etc.

At the end of the delivery process, if the staff or the inventory control system was expecting an order or package that has not been tendered, the driver may be advised or issued a further signal for the purpose of notifying the driver that the delivery was incomplete. To this end, the staff or the inventory control system may continually ask the driver if there is another order or package to put away until it has received all of the orders or packages the staff or inventory control system was told to expect. If the driver indicates "no" (for example, by interacting with a keypad), the inventory control system may respond with a "delivery incomplete" message/signal, usually indicating to the driver that the committed manifest indicated that there is another order or package for this site still on his truck. The driver is preferably required to override the "delivery incomplete" message/signal to terminate the put away process. Overriding the "delivery incomplete" message may result an alert condition that causes certain automated communications to be issued. Any overage in the put away process may similarly create an alert condition that causes certain automated communications to be issued. Generally, communication concerning any underage or overage of package placements could be sent real-time to a supervisor or a security monitoring system, as evidence of possible theft; to the inventory system(s), as an alert to a probable inventory discrepancy; and/or to a delivery performance measurement system.

Once the delivery process has been completed, the staff or the inventory control system of the ship-to site preferably transmits the results of the delivery process to the manifesting system of the vendor, thereby creating a very abuse-resistant and error-resistant closed loop control mechanism. Upon receiving the results of the delivery process, the inventory records of the vendor manifest system may be updated to reflect the fact that the orders or packages have been received at the remote sites and are available at that location. As such, anyone with access to the manifest system of the vendor, which may include the customer, can see the location and status of any order or package in close to real-time, and could do a physical inventory against any truck or remote ship-to site. In this same manner, the removal of orders or packages from a ship-to site may also be reported to the manifest system of the vendor to ensure a continued update of the inventory records of the vendor.

Upon completing delivery of the orders or packages to the appropriate ship-to site, the customer may now access the ship-to site to retrieve the orders or packages at their convenience. As noted, the retrieval of the orders or packages may require the customer to enter a PIN or ORN into the inventory control system of the ship-to site before being allowed access to orders or packages. Preferably, the customer is provided with an opportunity to then inspect the goods to accept or reject the order (for example, by interacting with designated keys of a keypad). In the case where the customer indicates an acceptance of an orders or package, it is anticipated that the customer will then remove the order or package from the ship-to site and, accordingly, the acceptance of the order or package from the ship-to site is preferably reported back to the manifest system of the vendor and additional processing may be performed, for example, billing of the customer, debiting of a customer account, etc. It is to be understood that the acceptance and removal of an order or package from the ship-to site and the reporting of such action to the manifest system of the vendor could be fully automated, in particular when automated dispensing technology is used at the ship-to site.

Figure 5:
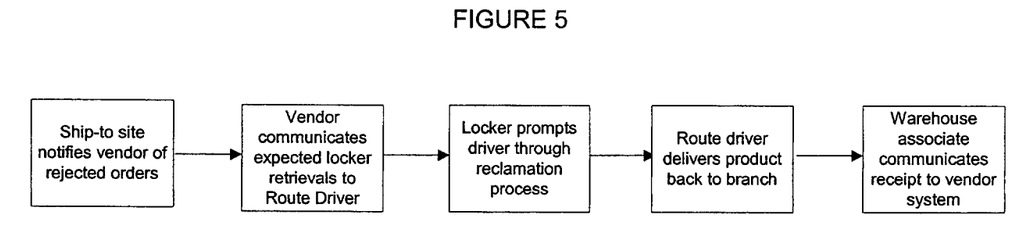
FIG. 5 is a flow chart illustrating exemplary steps in an order return process.

In the event that the customer rejects the goods that have been delivered to the ship-to site, the staff or system may implement a return process from the ship-to site. As illustrated in FIG. 5, the goods return process is preferably initiated by the ship-to site notifying the vendor of the rejection of the order at which time the vendor may schedule a return of the driver to the ship-to site. The "to-be-returned" status is also preferably entered into the manifesting system of the vendor at this time. In this manner, when the driver returns to the ship-to site, the driver may identify himself to the staff or inventory controller of the ship-to site whereupon the ship-to site may prompt the driver to remove the orders or packages to be returned. Once the driver removes the orders or packages to be returned from the ship-to site, the ship-to site preferably sends a transmission to the manifest system of the vendor to notify the vendor to expect the orders or packages for receipt back at the warehouse. Upon returning the orders or packages to the warehouse, a warehouse associate preferably communicates the receipt of the returned orders or packages to the manifest system of the vendor and the goods may then be re-shelved, marked as damaged, etc. It will be appreciated that this "reverse logistics" shipment method may also be used to inform a route driver to pick up other goods or items for return to a storing or servicing warehouse (e.g., returned goods, abandoned deliveries, empty containers, etc.) while providing a means to control and audit such returns.

The system may also be adapted to react to customer order cancellations. For example, should the customer cancel an order for goods while the goods are staged for delivery or en-route to the ship-to site, i.e., at a time after the manifest has been committed, the system may react by notifying the staff or inventory control system of the ship-to site to remove the order as an expected delivery. The manifest system will also initiate the necessary steps to return goods into inventory at the warehouse. Similarly, should the customer cancel an order for goods after the orders or packages have been delivered to the ship-to site, the system may react by initiating a return order process similar to the one used if the customer rejected the goods upon inspection.

To further enhance customer satisfaction with the described system for delivering orders for goods, the system may also provide customers with order "cut-off" times for ship-to sites on specific routes, whereby the customer will know a time-by which to place an order to ensure delivery at his chosen site within a given time frame. This information may be provided to a customer by being published, for example, via means of a Web site, telephone access system, brochure describing the service, or the like. The draft manifest may then be generated automatically at the published "cutoff" time for a route, or a few minutes later to allow for processing delays.

While specific embodiments of the invention have been described in detail, it will be appreciated by those skilled in the art that various modifications and alternatives to those details could be developed in light of the overall teachings of the disclosure. For example, the various processes described and illustrated may be implemented using either hardware and/or software without limitation. Furthermore, it is to be appreciated that the order of various of the process steps described herein may be varied to achieve the same results. Accordingly, the particular arrangements disclosed are meant to be illustrative only and not limiting as to the scope of the invention which is to be given the full breadth of the appended claims and any equivalents thereof.

All of the references cited to within this document are hereby incorporated by reference in their entirety.

What is claimed is:

1. A system for facilitating and controlling route-based delivery of an orders for goods from a central servicing warehouse to a remote ship-to sites, comprising:
   a self-service, drop-off container located at the remote ship-to site;
   an inventory control system associated with the self-service, drop-off container;
   a device for reading from a machine readable label a code that has been assigned to a good to be deposited within the self-service, drop-off container in communication with the inventory control system and associated with the self-service, drop-off container;
   a manifesting system in communication with the inventory control system, the manifesting system providing to the inventory control system a committed manifest wherein the committed manifest includes a listing of codes that have been assigned to each good to be deposited within the self-service, drop-off container; and
   a security monitoring system in communication with the inventory control system;
   wherein the inventory control system uses the committed manifest and data provided by the device for reading from a machine readable label as obtained by the device for reading from a machine readable label as each good is being deposited with the self-service, drop-off container to determine if any good that is being deposited within the self-service, drop-off container is not assigned to be deposited within the self-service, drop-off container, to provide an audible or visual alert when it is determined that a good that is being deposited within the self-service, drop-off container is not assigned to be deposited within the self-service, drop-off container, to determine, after input has been provided to the inventory control system to indicate that all goods have been deposited within the self-service, drop-off container, whether any goods to be deposited within the self-service, drop-off container are missing, and to automatically generate and send a communication alert to the security monitoring system when it is determined that one or more goods to be deposited within the self-service, drop-off container are missing.

2. The system as recited in claim 1, wherein the device for reading from a machine readable label a code comprises a bar code reader.

3. The system as recited in claim 1, wherein device for reading from a machine readable label a code comprises an RFID tag reader.

4. The system as recited in claim 1, wherein the inventory control system transmits delivery results to the manifesting system so that inventory records of the manifesting system may be updated to reflect that goods have been received at the ship-to site and are available for pick up by a customer from the self-service, drop-off container.

5. The system as recited in claim 1, wherein the self-service, drop-off container comprises a lock which requires a customer to identify themselves appropriately using a previously determined PIN or ORN in order to be allowed access to goods deposited within the self-service, drop-off container.

6. The system as recited in claim 1, wherein the inventory control system reports back to the manifesting system a removal of a good from the self-service, drop-off container so that order status and inventory records maintained by the manifesting system may be updated.

7. The system as recited in claim 6, wherein the manifesting system causes a customer to be automatically billed in response to receiving a notification of the removal of the good from the self-service, drop-off container.

8. The system as recited in claim 6, wherein the manifesting system causes a customer account to be automatically debited in response to receiving a notification of the removal of the good from the self-service, drop-off container.

9. The system as recited in claim 1, wherein the self-service, drop-off container comprise a vending machine.

10. The system as recited in claim 1, wherein the self-service, drop-off container comprises a will-call locker.

* * * * *